A. T. MARSHALL.
VALVE CONTROL SYSTEM.
APPLICATION FILED MAR. 22, 1918.

1,326,603.

Patented Dec. 30, 1919.
5 SHEETS—SHEET 1.

Inventor
By his Attorney

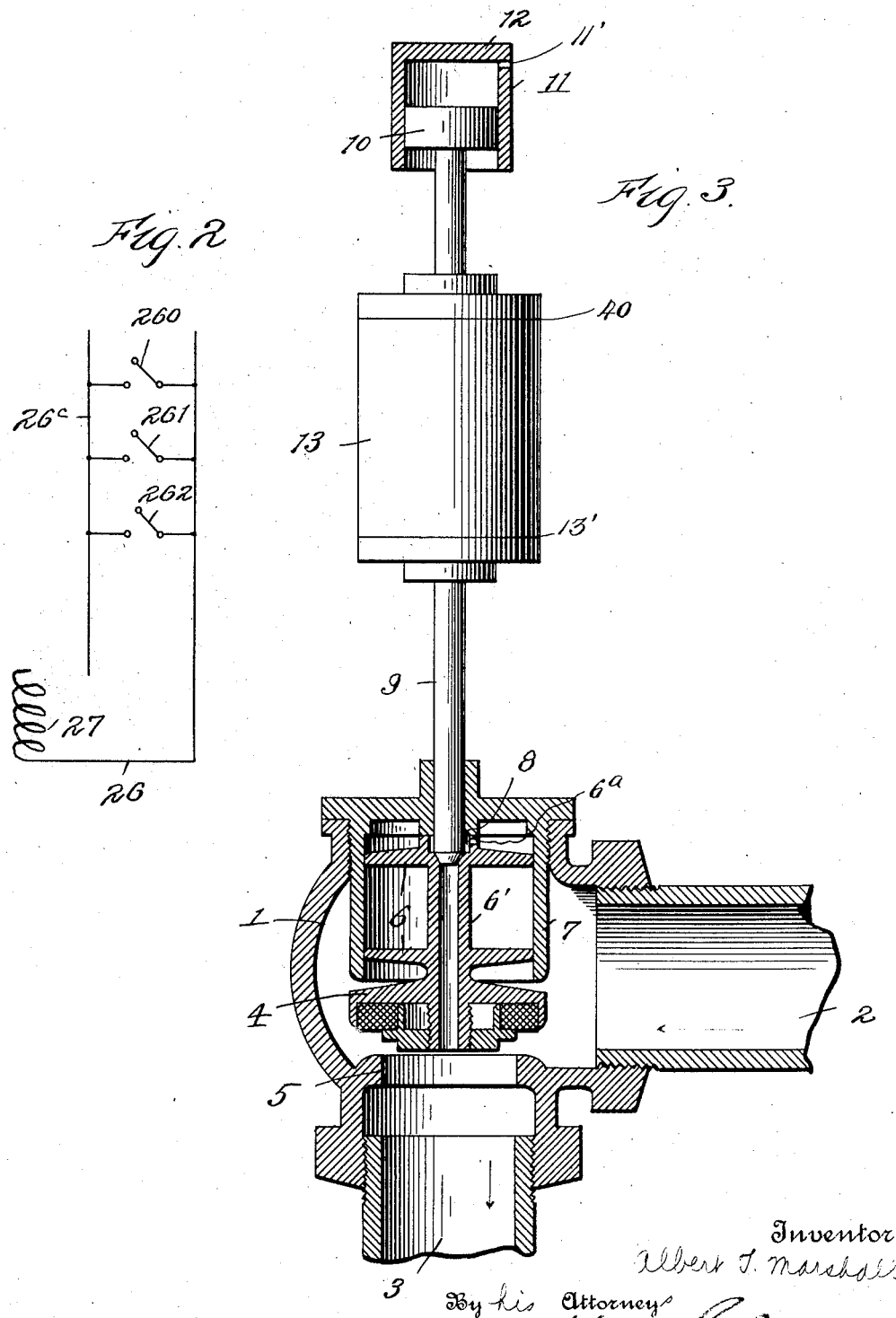

A. T. MARSHALL.
VALVE CONTROL SYSTEM.
APPLICATION FILED MAR. 22, 1918.

1,326,603.

Patented Dec. 30, 1919.
5 SHEETS—SHEET 3.

Inventor
Albert T. Marshall
By his Attorneys

A. T. MARSHALL.
VALVE CONTROL SYSTEM.
APPLICATION FILED MAR. 22, 1918.
1,326,603.
Patented Dec. 30, 1919.
5 SHEETS—SHEET 4.
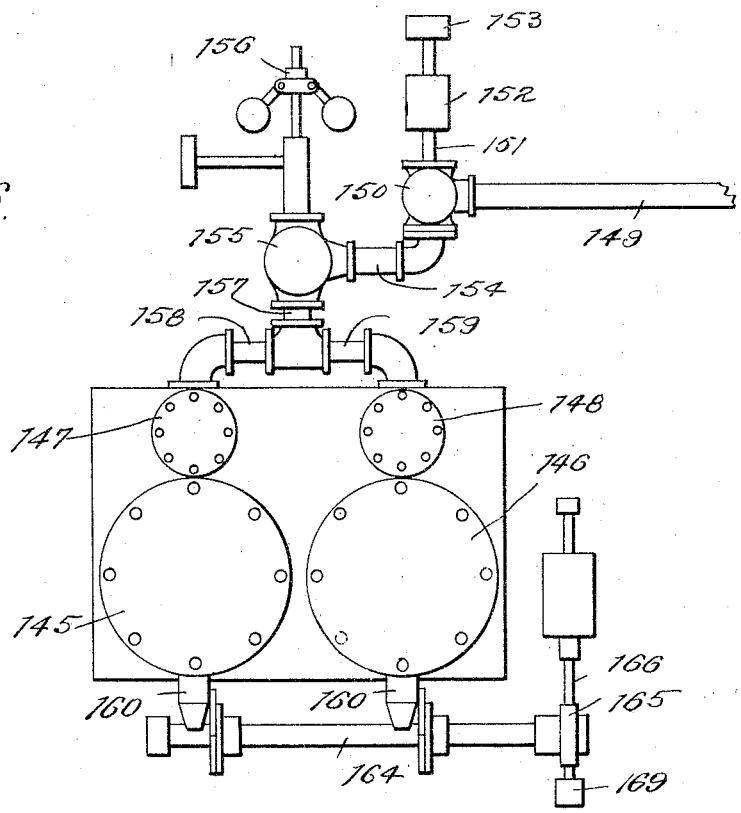
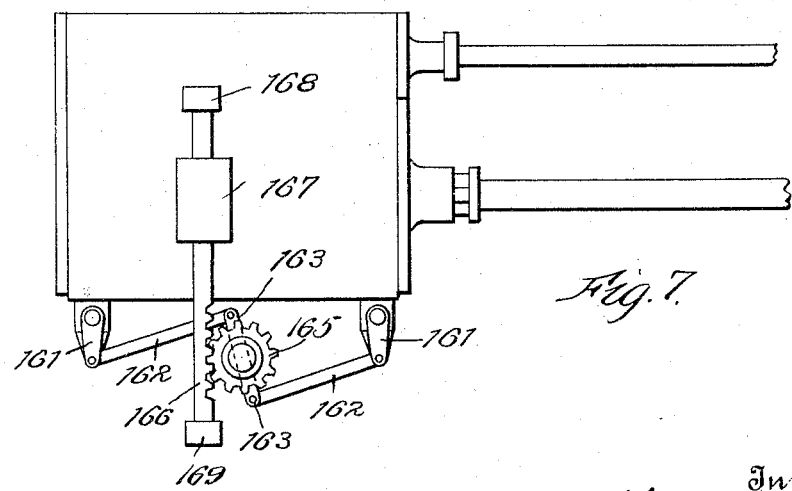
Inventor
Albert T. Marshall
By his Attorneys

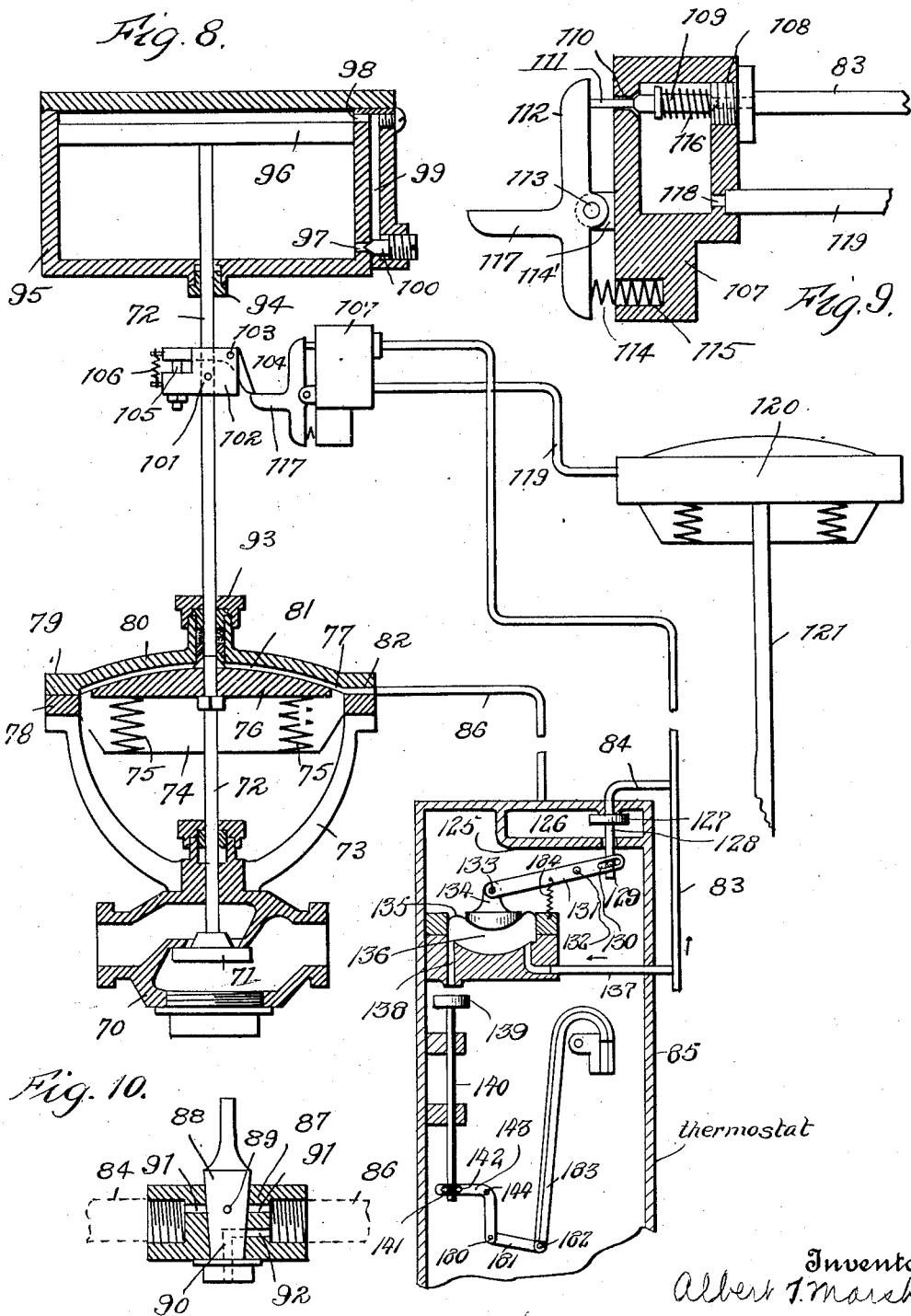

UNITED STATES PATENT OFFICE.

ALBERT T. MARSHALL, OF HARTFORD, CONNECTICUT, ASSIGNOR TO AUTOMATIC REFRIGERATING COMPANY, OF HARTFORD, CONNECTICUT, A CORPORATION OF NEW JERSEY.

VALVE-CONTROL SYSTEM.

1,326,603.   Specification of Letters Patent.   Patented Dec. 30, 1919.

Application filed March 22, 1918. Serial No. 223,960.

*To all whom it may concern:*

Be it known that I, ALBERT T. MARSHALL, a citizen of the United States, resident of Hartford, county of Hartford, and State of Connecticut, have invented certain new and useful Improvements in Valve-Control Systems, of which the following is a full and clear specification.

This invention relates to valve control systems and has for its main object to provide improved means for controlling the valves of a fluid pressure engine from one or more stations distant from said engine. One of the objects of the present invention is to provide improved means controlled from a distance, temporarily augmenting the supply of pressure fluid to a fluid pressure engine during a period in which said engine is started or accelerated. Another of the objects is to coördinate the operation of an admission valve and a relief cock which are used more especially in connection with steam engines. Preferably the operation of one of the valves is preceded by and depends upon the operation of another of the valves. The invention is applicable to various types of engines and may be advantageously employed in coöperatively regulating the operation of a number of valves with respect to each other.

Some adaptations of my invention are shown on the accompanying drawings, and referred to in the specification.

In the drawings:

Fig. 2 is a fragmentary portion of the same with the exception that the thermostat is replaced by push buttons or switches at a number of distant stations;

Fig. 3 is an axial section of a suitable valve for a system of the character to be hereinafter described, parts being broken away and parts shown in elevation;

Fig. 6 is an end elevation of a compound steam engine in which my invention is adapted to the coöperative control of a steam admission valve and cylinder relief cocks;

Fig. 7 is a side elevation of the same;

Fig. 8 is a diagrammatic section of another embodiment of my invention, parts being shown in elevation;

Fig. 9 is an enlarged sectional view of parts shown in elevation on Fig. 8, parts being shown in elevation;

Fig. 10 is an enlarged section of a modified detail, parts being shown in elevation.

Figure 1:
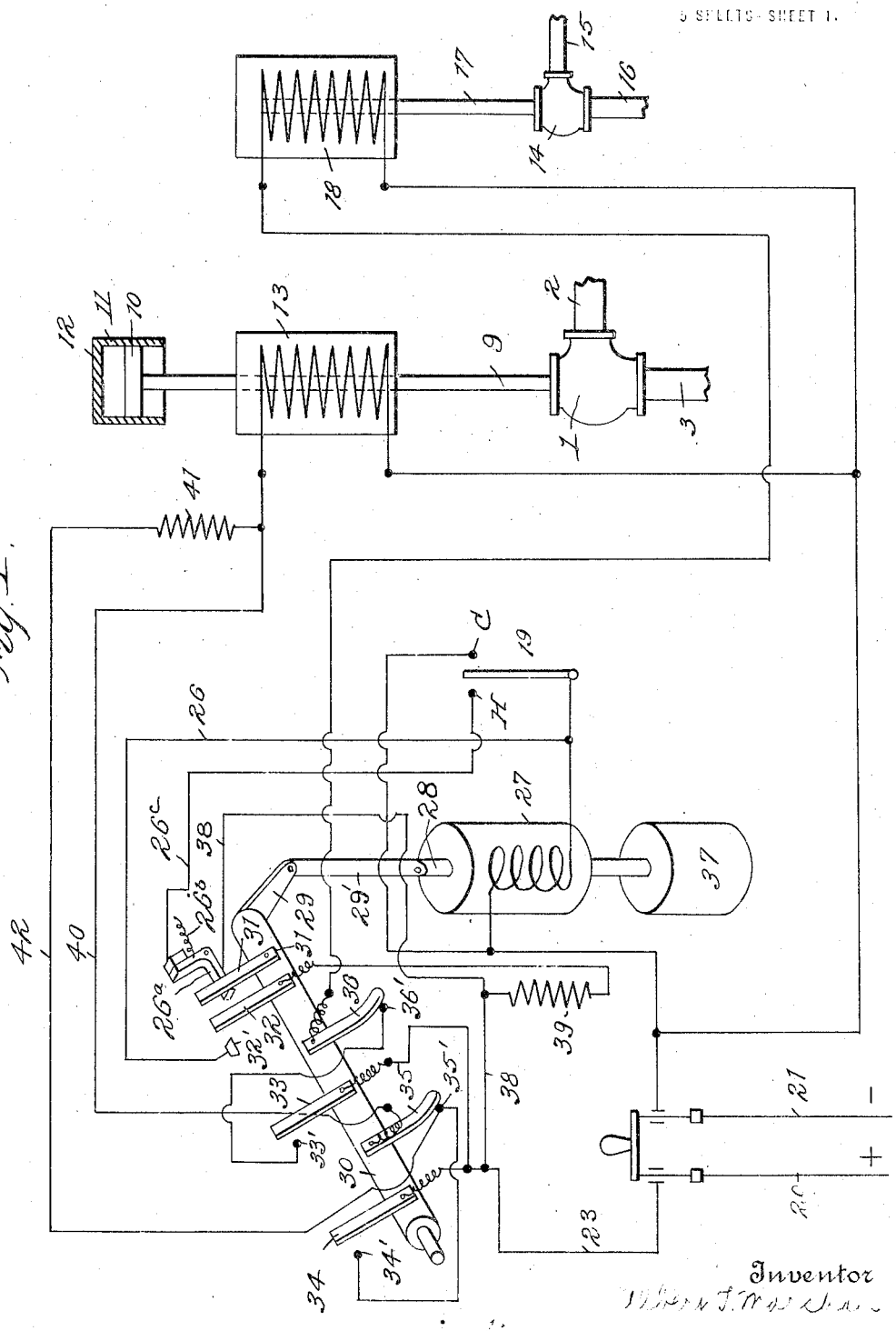
Figure 1 is a wiring diagram for one embodiment of my invention which may be automatically controlled by a thermostat.

The present invention contemplates suitable means for controlling a number of valves which may be made to coöperate in the economic operation of a fluid pressure engine. In order to simplify the explanation of my invention, each of the hereinafter described embodiments are shown to include but two coöperatively operated valves. A suitable type of valve is shown in detail in Fig. 3 of the drawings and comprises casing 1 to which is connected a supply pipe 2 and from which extends another pipe 3. As shown in Fig. 3, the casing 1 contains a valve head which comprises a valve 4 adapted to close down on its seat 5, and a pair of axially spaced disks 6 which fit loosely in the sleeve 7, said valve 4 and disks 6 being mounted on a central tubular body 6'. The upper end of the passage extending through the tubular body 6' is normally closed by the lower end of a solenoid plunger 9 which acts as a valve with a small valve chamber 8. A port 6ª which extends radially through an annular flange on the upper disk 6, affords communication between the valve chamber 8 and the chamber above the upper disk 6. It will be seen from this description that whenever the plunger 9 is raised, the central tubular passage within the tubular body 6' is opened at the top whereupon the fluid pressure in the main 2, acting on the underside of the lower disk 6, raises the valve 4 from its seat 5. As soon as the plunger 9 again closes the upper end of the tubular body 6, the pressure on the top surface of the valve 4 accumulates until it is sufficient to seat the valve.

The plunger 9 has at its upper end a piston 10 working in cylinder 11, thus forming a dash pot whose retarding effect is opposed to the upward movement of the plunger 9. This dash pot is provided with the usual valve, (not shown) in the top wall 12 for varying the sensitiveness of the action. Intermediately of the dash pot 11 and valve 4, is arranged a solenoid 13 which when energized is adapted to raise the plunger 9 against the retarding action of dash pot 11. Said dash pot thus regulates the opening movement of valve 8 and produces a gradual admission of steam to the turbine or other engine. A relatively small power is required to raise the plunger 9, since the work of opening the valve is done by the pressure in the pressure fluid. Said valve at 8 is closed by gravity when the plunger 9 is released by the solenoid.

Referring now to Fig. 1, another valve 14 which may be substantially similar in construction to the valve above described, may be coöperatively operated in the manner to be hereinafter pointed out. This valve has connected thereto a supply pipe 15 and another pipe 16 leading therefrom and is provided with a valve stem 17 adapted to be operated by a solenoid 18. The valve stem 17 may or may not be provided above with a suitable dash pot to render it a slow acting valve, depending on the manner in which it is embodied in service. If, as is indicated in Fig. 1, the system is to be controlled by a thermostat, the movable member 19 is arranged to contact with either of the fixed contacts C or H. A switch bar 30 is mounted to oscillate on its longitudinal axis, and makes or breaks, as the case may be, the electrical connection of arm 32 with contact 32', of arm 33 with contact 33', of arm 34 with contact 34', of arm 35 with contact 35' and of arm 36 with contact 36'. The contact carried by the bell crank switch 26ᵃ is normally closed by spring 26ᵇ but is adapted to be opened by the arm 31 striking said bell crank switch when the switch bar 30 is rotated on its axis and out of its normal position shown in Fig. 1. Arm 31 has only a mechanical function and is therefore insulated from the switch 26ᵃ. At one end the switch bar 30 terminates in the rigid arm 29 which is pivotally connected to the link 29'. The link 29' at its lower end is pivotally connected to the stem 28 which forms the core of a solenoid 27. Thus the solenoid is adapted when energized to rotate the switch bar 30 by raising the core 28. A dash pot 37 connected with the lower end of stem 28 serves to retard the movement of the stem so that by varying the sensitiveness thereof, the rotation of the switch bar 30 from its normal position to the limit of its rotation, can be made to consume any desired amount of time. In this manner the groups of contacts hereinafter referred to may be made to take effect successively and at predetermined intervals.

The operation of the system in its present application may be as follows: Let us suppose that the temperature of a refrigerator or cold storage room has arisen to the predetermined maximum and it has therefore become desirable to start the compressor in order to furnish cooling medium to the refrigerating coils. Thermostat 19 is adjusted to close the gap between it and contact H when the maximum temperature exists. Thereupon a circuit is closed through 20, 23, 38, 26ᵃ, 26ᶜ, H, 19, 27 and 21, thus energizing coil 27 and starting plunger 28 upward. As stated, the upward movement of core 28 effects rotation of the switch bar 30. Contact arm 32 is normally but a slight distance from contact 32' so that the initial movement of the bar 30 closes the circuit through 20, 23, resistance 39, arm 32, 32', 26, 27 and 21. This acts as a maintaining circuit to hold the plunger 28 if thermostat 19 makes a wavering contact. Also this maintaining circuit holds plunger 28 at its highest position when at the end of the motion, arm 31 has moved bell crank switch 26ᵃ. Contact arm 32 is yieldable to permit lost motion between 32 and 30 during the continued rotation of 30 after contact 32' is made. In the normal, inoperative position of the switch bar 30, contact arms 35, 36 are yieldably pressed against their respective contacts 35', 36'. Arms 34, 33 on the other hand, are slightly raised off their respective contacts 34', 33'. Arms 35, 36, 34, 33 are all preferably constructed of flexible material so as to permit a limited amount of lost motion between said arms and the bar 30. This construction operates in regard to arms 35, 36 to maintain them on their respective contacts until after arms 34, 33 have contacted with 34', 33', and in regard to arms 34, 33 operates to permit a continuance of the rotation of bar 30 after 34, 33 have contacted with 34', 33' respectively. The closing of circuits 20, 23, 34, 34', 35', 35, 40, 13, 21 energizes coil 13 and raises plunger 9. As already explained the raising of plunger 9 gradually opens the supply valve 4 and when said plunger 9 has reached its highest position the valve 4 will be wide open and will be maintained in that condition until the solenoid 13 is deënergized and the plunger 9 drops by its own weight. In order to economize current, a resistance coil 41 is connected by a wire 42 to contact 35' so that after the plunger 9 has been raised, the current passing through solenoid 13 will pass through resistance 41, by reason of contact 35 having moved from contact 35' Less current will therefore be consumed in holding plunger 9 in raised position. A similar function is performed by resistance coil 39 which is automatically cut out whenever arm 32 is moved away from contact 32' by the return movement of contact bar 13

30 when the arm 31 operates switch lever 26ª into circuit-closing position so that the next energization of solenoid 27 will be effected through the circuit which does not include resistance 39. It will be understood from the references hereinbefore made that when an engine is being started, it may be desirable to provide a temporarily increased flow of the pressure fluid. For this purpose the valve 14 may be employed, and may be opened by solenoid 18 which is temporarily energized by a circuit under the control of contact arms 33 and 36 which are suitably disposed on the oscillatory bar 30 so that contact 36 remains against contact 36' for a short interval of time after contact 33 rests against contact 33'. As soon however, as the continued movement of bar 30 has moved contact 36 away from contact 36', solenoid 18 becomes deënergized and the valve 14 closes. In place of the thermostatic control this system may be brought under the control of any desired number of press buttons or switches located at distant stations. Thus as shown in Fig. 2, the gap between wires 26 and 26ᶜ according to Fig. 1, may be bridged by any one of a number of push buttons or switches 260, 261, and 262, located for example on different floors of a building.

Figure 4:
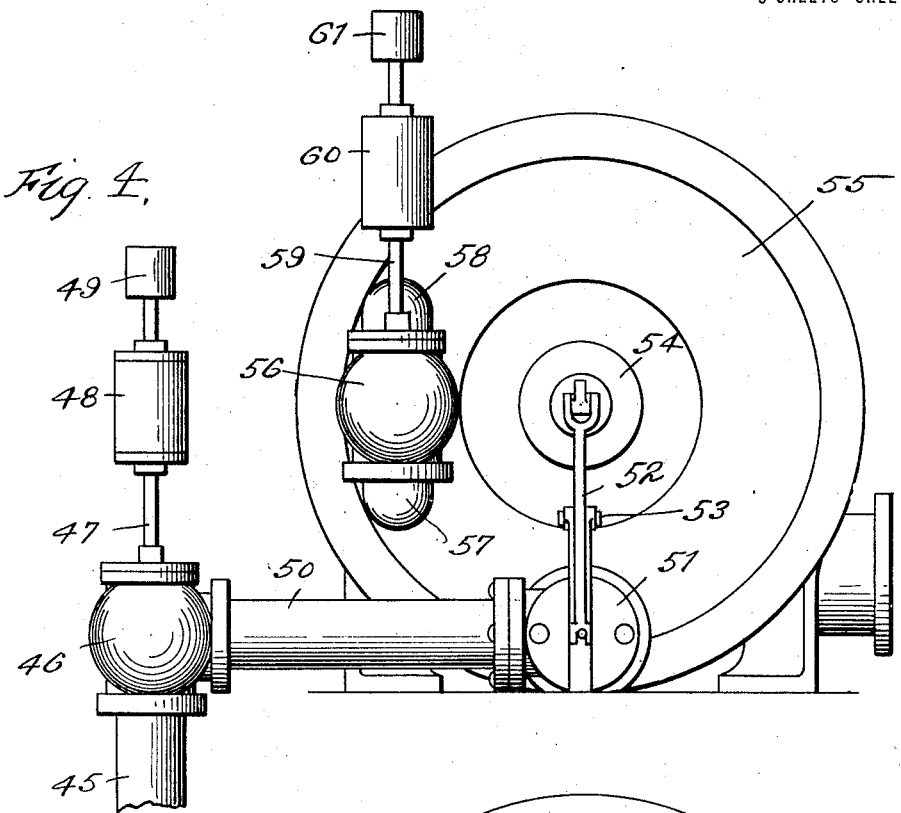
Fig. 4 is a side elevation of one adaptation of my invention to a Terry turbine, parts being broken away.
Figure 5:
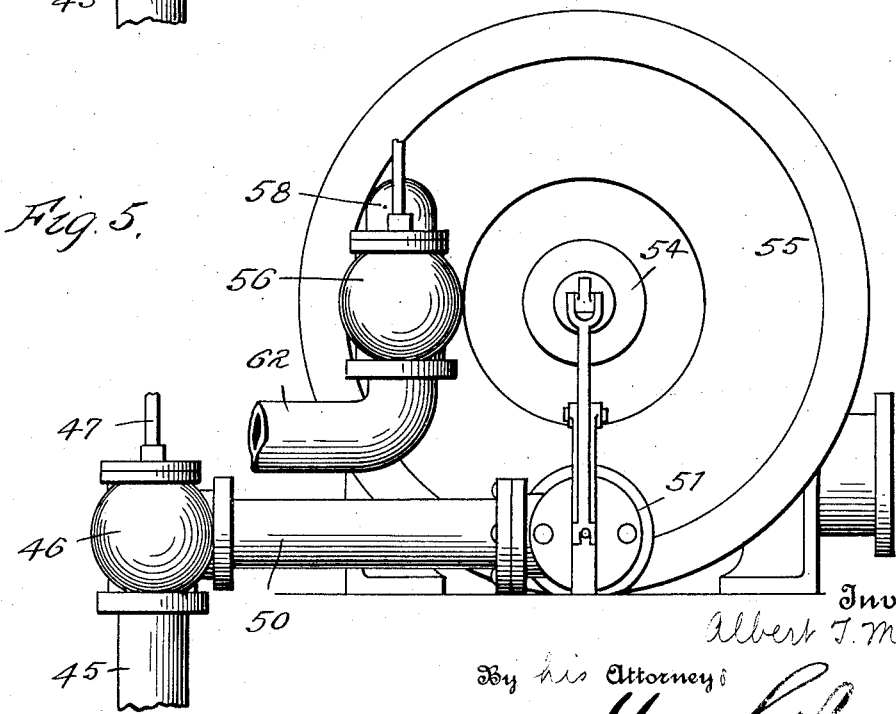
Fig. 5 is a side elevation of a modification of the same, parts being broken away.

Fig. 4 of the drawings shows an adaptation of my invention to a Terry turbine. In this embodiment of my invention, a steam pipe 45 is connected to a steam control valve 46 of substantially similar construction to that shown in Fig. 2. Thus the valve stem 47 of this valve is subject to a solenoid 48 and is rendered slow in its movements by a dash pot 49 at the top. A connecting pipe 50 leads from the slow action valve 46 to the usual governor valve 51 of the Terry turbine which is operated through a lever 52 pivoted at 53, by means of a governor contained in a housing 54 extending around the turbine shaft. The steam which passes the governor valve 51, enters an annular steam chest 55. In the Terry turbine as usually constructed, any desired number of hand valves are provided for controlling the flow of steam from the steam chest to nozzles (not shown) which discharge against the rotor blades or buckets. According to the embodiment of my invention shown in Fig. 4, one of these valves is shown at 56 and is connected up with the annular steam chest by means of an elbow 57. Another elbow 58 connects the valve 56 with one of the nozzles (not shown). A valve stem 59 is adapted to be operated by a solenoid 60 under the retarding action of the dash pot 61 which of course, may be left off if a quick acting valve is desired. Solenoids 48 and 60 are adapted to be connected up in an operating system such as that shown in Fig. 1. Referring now to the embodiment shown in Fig. 5, the pressure fluid passes from supply pipe 45 through valve 46, pipe 50, and the governor valve 51 into the annular pressure fluid chest 55 from which any desired nozzles (not shown) may receive pressure fluid for driving the turbine. In this embodiment, however, a temporarily increased supply of pressure fluid is provided for starting the turbine by means of a supply pipe 62 which conveys pressure fluid from a source outside of the steam chest 55 to the valve 56 which is connected up with the interior of the turbine by means of the elbow 58. In this, as in the other embodiment, valves 46 and 56 may be coöperatively controlled by the wiring system shown in Figs. 1 and 2.

Referring now to the embodiment of my invention shown in Figs. 6 and 7, a duplex steam engine has the cylinders 145 and 146 above which are the valve chambers 147 and 148 respectively. The cranks of this engine may be placed at right angles so that there can be no dead center. A steam supply pipe 149 leads to a valve 150 having a valve stem 151 constituting the plunger of a solenoid 152 which is governed by a dashpot 153. The energization of the solenoid 152 may be effected by means of a wiring system similar to that shown in Fig. 1. A pipe 154 connects valve 150 with another valve 155 which is subject to a ball governor 156. Leading from the valve 155 is a steam pipe 157 provided with branches 158 and 159 which lead respectively to valve chambers 147 and 148. Connected to either end of the cylinders 145 and 146 are drain cocks 160, said drain cocks being preferably of the safety valve type in which springs hold the valves to their seats against the pressure in the cylinders, and thus affording relief at any time there is too much moisture in the steam. Each of the drain cocks is provided with an operating arm 161. In the present embodiment, the drain cock operating arms at opposite ends of each cylinder are connected by rods 162 to a lever 163 carried by a rotary shaft 164. Keyed to the shaft 164 is a gear 165 which meshes with a rack bar 166 which extends upwardly and constitutes the plunger of a solenoid or other electroresponsive device 167. The upper end of rod 166 is provided with a dash pot 168 for regulating its sensitiveness in action. If desirable, the lower end of rod 166 may be provided with a weight 169 for aiding its return to lowered position, after it has been released by the solenoid. The electroresponsive device 167 is connected up in a suitable operating system and in connection with the solenoid 152 in such a way as to insure that the drain cocks will open quickly and a little ahead of the main steam valve which opens slowly. After the main steam valve has opened and the engine has become accelerated, the solenoid 167 becomes deënergized and thus causes the drain cocks to close for giving the engine her compression for cushioning. It will be understood that the rack and gear construction as shown constitute only one of various methods for operating the drain cocks. In the event that the weight of core and rack is sufficient to close the drain cocks when released by the solenoid, the use of weight 169 becomes unnecessary. As an illustration, an advantageous field for the employment of my invention, is found in the two-cylinder steam engine which is commonly employed aboard ship with remote hand control for hoisting, operating the capstan, etc.

Figs. 8, 9 and 10 of the drawings show an application of my invention according to which the system is controlled pneumatically. In Fig. 8 is shown a valve housing 70 which may be interposed between a pressure fluid reservoir and a fluid pressure engine. Within this housing is a downwardly opening valve 71 provided with a valve stem 72 which reciprocates in a spider 73. Said spider 73 carries a pneumatic head or pouch including a strap or web 74, which supports compression springs 75. Resting upon the upper ends of springs 75 and secured to the valve stem 72 is a block 76. Extending over the upper surface of the block 76 is a diaphragm 77 which is secured around its periphery between clamping flanges 78 and 79, the latter flange forming the periphery of a cap or cover 80 between which and the diaphragm 77 there is normally a shallow air chamber provided with an inlet port 82 in flange 79. An air pressure supply line 83 has connected thereto a branch 84 leading to a thermostatic air valve 85 of the wide open or shut type which may be disposed at a distant station and is adapted to control the flow of air to the air chamber 81 by way of connecting pipe 86. If desired, the automatic valve 85 may be replaced by the hand operated valve shown in Fig 10 and comprising a casting 87 adapted to be connected up between pipes 84 and 86 and a rotary key 88 provided with a diametrical port 89 and combined radial and axial port 90. Said casting 87 is provided with suitable ports 91 and 92 which coöperate with ports 89 and 90 in different positions of key 88. The valve stem 72 extends through a stuffing box 93 in the cover 80 and another stuffing box 94 in the lower wall of a dash pot 95. A piston 96 is secured to the upper end of the valve stem 72 and is adapted to reciprocate between air ports 97 and 98 which are connected by an air passage 99. A valve 100 is adapted to control the flow of air through port 97 and from one side to the other of piston 96 for the purpose of regulating the speed of valve 71 in its opening and closing movements. Secured to the valve stem 72 by a pin 101 is a block 102. Pivotally mounted on this block at 103 is an angular dog 104, the tail of said dog being normally held against an abutment 105 by means of a spring 106. The air supply pipe 83 is connected to an inlet port 108 in a valve housing 107, said inlet port being opened or closed by a valve 109 which is also adapted to open and close an exhaust port 110. The valve 109 is provided with a stem 11 which is engaged by one arm of a valve operating lever 112 which is pivoted at 113 to a lug 114 on the valve housing 107. A compression spring 114 arranged in a socket 115 is adapted to hold the lever 112 against the valve stem 111. The spring 114 is stronger than a spring 116 which tends to hold the valve 109 away from its seat. Extending laterally from the lever 112 is a tappet arm 117 which is suitably shaped at its outer end to be positively engaged by the dog 104 on the downward or opening movement of the valve 71 and to permit said dog to drag thereover on the upward or closing movement of said valve.

As shown in Fig. 9, the valve housing 107 is provided with an outlet port 118 from which leads a pipe 119 which connects with a pneumatic unit 120 of substantially similar structure to that already described above. The pneumatic unit 120 serves to operate a valve stem 121 of a valve similar to valve 70, 71, for controlling the flow of pressure fluid. The operation of this embodiment of my invetnion will now be understood. Let it be supposed, for example, that the valve 71 is the main control valve of a pressure fluid engine and that the valve operated by the stem 121 constitutes an auxiliary valve for admitting additional pressure fluid to the engine during the starting period. Whenever valve 88 is operated or valve 85 becomes operative, air under pressure is admitted to the air chamber above diaphragm 77, causing said diaphragm to be depressed and the valve 71 to open. This operation admits pressure fluid to the engine (not shown). At the same time, as the valve stem 72 moves downwardly, the dog 104 engages tappet arm 117 and by compressing spring 114, permits spring 116 to move valve 109 toward the left, thus closing the exhaust port 110 and opening the inlet port from pipe 83. Immediately, air under pressure flows into the valve chamber and through the port 118 into the pipe 119 which conveys it to the pneumatic unit 120 and thus operates the valve stem 121 to open an auxiliary valve (not shown) for providing an additional supply of pressure fluid to the engine. By the time the valve 71 reaches its widest open position, the dog 104 has slipped from the tappet arm 117 and permitted it to return to normal position under the pressure of spring 114 which closes the inlet port from pipe 83 and opens exhaust port 110. This action permits the pneumatic unit 120 to return to normal and thus closes the auxiliary valve after which the engine may operate under the fluid which passes valve 71.

I claim:—

1. The combination with an engine provided with two admission valves, of operating means connected to said valves independently of all other parts of said engine, comprising means for opening and closing one of said valves, and means set into operation when that valve is opened for opening the other said valve and closing said other valve again within a limited time period after the valves are open.

2. The combination with an engine, provided with a main admission valve and an auxiliary admission valve arranged to supply supplemental steam at starting, of means for opening said valves, and means set into operation when said valves are opened for closing said auxiliary valve within a limited time period after said valves are open, said time period being independent of the operation of said engine.

3. The combination with an engine provided with a main valve and an auxiliary valve, of means deriving its power from a source outside of said engine for opening said main valve, and means set in operation by the operation of said main valve operating means for opening and closing said auxiliary valve.

4. A system or apparatus for controlling the starting of a steam engine from a distant point, comprising a main valve, an auxiliary steam valve arranged to supply supplementary steam at starting, and means operable at a distant point for controlling said valves, comprising means for opening the main valve, and means set into operation when the main valve is opened for opening and closing said auxiliary valve.

5. The combination with an engine provided with fluid control valves, of means operating independently of the pressure fluid which runs said engine for opening and closing said valves, one of said valves being operated for a relatively short portion of the period during which the other valve is operated.

6. The combination with a pressure fluid engine provided with main and auxiliary admission valves, solenoids for operating said valves, and energizing circuits for said solenoids, including a circuit controlling instrumentality, said circuits being adapted when said instrumentality is set in motion to open both valves for starting the engine and then to close said auxiliary valve for running said engine.

7. The combination with a pressure fluid engine provided with main and auxiliary admission valves, solenoids for operating said valves, a resistance adapted to be thrown into and out of circuit with the main valve solenoid, and energizing circuits for said solenoids, including a circuit controlling instrumentality, said circuits being adapted when said instrumentality is set in motion to open both valves for starting the engine and then to close said auxiliary valve for running said engine, said circuits excluding said resistance from the main valve solenoid energizing circuit during the starting period and including said resistance after said starting period.

8. In a valve control system, a fluid pressure engine, fluid control valves connected to said engine, and means for controlling the operation of said valves from a distance, said valves being connected with said engine and with each other so that the fluid passing through one of them has first passed through the other.

9. The combination with a main starting valve for a fluid pressure engine, of a supplemental valve having independent piping connections for providing additional pressure fluid for starting said engine, and thermostatically controlled means for operating said valves together when the fluid pressure engine is started and for interrupting the operation of one of said valves independently of the other.

10. In a device of the character described, a main valve, an operating solenoid therefor, an auxiliary valve for controlling a fluid passage different from that controlled by said main valve, an operating solenoid for said auxiliary valve, means for energizing said main valve operating solenoid, and means for energizing said auxiliary valve operating solenoid, the energizing means for said auxiliary valve solenoid being operated by the operation of said main valve solenoid energizing means.

11. The combination with a main valve, of a supplemental valve, said valves being adapted to control the flow of pressure fluid through independent piping connections, an electro-responsive device for separately operating each of said valves, energizing circuits for said devices respectively and means for making said circuits at substantially the same instant and breaking one of said circuits without interrupting the other.

12. In a device of the character described, a valve, an operating solenoid therefor, an energizing circuit for said valve operating solenoid including a switch, a solenoid for operating said switch, an energizing circuit for the last-mentioned solenoid including a thermostatically operated switch and a normally closed contact adapted to be moved into circuit-breaking position by the operation of the first-mentioned switch, the energizing circuit for the last-mentioned solenoid being provided with a normally open branch adapted to be closed by said movable contact to maintain the energization of the last-mentioned solenoid independently of said thermostatic switch.

13. In a device of the character described, a main valve, an operating solenoid therefor, an auxiliary valve for controlling a fluid passage different from that controlled by said main valve, an operating solenoid for said auxiliary valve, means for energizing said main valve operating solenoid, and means for energizing said auxiliary valve operating solenoid, the energizing means for said auxiliary valve solenoid being operated by the operation of said main valve solenoid energizing means, said main valve solenoid energizing means being adapted to interrupt the operation of said auxiliary valve solenoid energizing means after a brief operation of the latter.

14. In a system of the character described, a main valve, a supplemental valve, electroresponsive means for operating said valves, circuits for energizing said electroresponsive means including a switch bar, and switch blades carried thereby for controlling said circuits, and means for moving said switch bar to close said circuits simultaneously and subsequently to open one of said circuits only.

15. In a device of the character described, a valve, electro-responsive means for operating said valve, an energizing circuit for said electro-responsive means including branches through which said electro-responsive means is energized at different times, a switch bar and yieldable contact blades mounted on said switch bar, one of said branches being connected up in circuit through said blades in series and the other of said branches being connected up in circuit through one of said blades only.

16. In a system of the character described, a valve, a supplemental valve, electro-responsive devices for operating said valves, energizing circuits for said valves respectively, each of said circuits being provided with switches, and thermostatically controlled means for operating said switches, said switches being arranged to terminate the operation of one of said valves independently of the other.

17. In a system of the character described, a main valve, a supplemental valve, a solenoid for operating each of said valves, energizing circuits for said solenoids, said circuits being provided with circuit-controlling switches, a movable member for operating said switches, a solenoid for moving said movable member, an energizing circuit for the last mentioned solenoid, and a thermostat for controlling the last-mentioned circuit.

18. In a system of the character described, a valve, electro-responsive means for operating said valve, a switch operating bar, an electro-responsive device for moving said bar, resistance circuits for energizing the last-mentioned device without including said resistance at one time and including said resistance at another time, means operated by the last-mentioned device for controlling said circuits, and an energizing circuit for the valve operating electro-responsive means including switches operated by said bar.

19. In a system of the character described, a valve, electro-responsive means for operating said valve, a switch operating bar, an electro-responsive device for moving said bar, resistance circuits for energizing the last-mentioned device without including said resistance at one time and including said resistance at another time, means operated by the last-mentioned device for controlling said circuits, and an energizing circuit for the valve operating electro-responsive means including switches operated by said bar, the energizing circuits for said bar-moving device being provided with a thermostatically controlled switch.

20. In a system of the character described, the combination with a steam engine, of a fluid control valve connected thereto, another fluid control valve separately connected to said engine, and an operating system for operating said valves successively from a remote station, said operating system including an electro-responsive device for each of said valves, an oscillatory bar, positive and negative line wires, yieldable contacts mounted on said bar and connected to one of said line wires, other yieldable contacts mounted on said bar and connected respectively to said electro-responsive devices, fixed contacts coöperatively related to the last mentioned flexible contacts respectively, said fixed contacts being electrically connected, other fixed contacts electrically connected and coöperatively related to one of the first-mentioned and one of the second-mentioned yieldable contacts respectively, and wires for connecting said electro-responsive devices to the other line wire.

21. In a system of the character described, the combination with a steam engine, of a fluid control valve connected thereto, another fluid control valve separately connected to said engine, and an operating system for operating said valves successively from a remote station, the operation of one of said valves being dependent upon the prior operation of the other.

22. In a system of the character described, the combination with an engine, of a fluid controlling valve connected thereto, an electro-responsive device for controlling the operation of said valve, an operating system for said electro-responsive device, including two branches of different degrees of resistance, for respectively starting and running said engine, and thermostatically controlled means for determining which of said branches is to be included in the operating circuit.

23. The combination with a fluid pressure engine provided with a valve for controlling the inlet of pressure fluid and another valve for providing additional pressure fluid to said engine, and thermostatically controlled means for operating said valves.

24. The combination with a fluid pressure engine provided with fluid control valves, of electrically operated means for controlling said valves, and electrical circuits for energizing said means, including a slow action switch adapted to open said valves and after a period of time to close one of them.

25. The combination with a turbine provided with a pressure fluid chest, a valve controlling the inlet of pressure fluid to said chest, another valve for controlling the flow of pressure fluid from the chest to the turbine rotor, and means for coöperatively actuating said valves.

26. The combination with a turbine provided with an inlet valve for pressure fluid and another valve for admitting additional pressure fluid, of means for coöperatively actuating said valves.

ALBERT T. MARSHALL.